(12) United States Patent
Chavali et al.

(10) Patent No.: US 9,170,956 B2
(45) Date of Patent: Oct. 27, 2015

(54) SYSTEM AND METHOD FOR VIRTUAL HARDWARE MEMORY PROTECTION

(71) Applicant: TEXAS INSTRUMENTS INCORPORATED, Dallas, TX (US)

(72) Inventors: Balatripura Sodemma Chavali, Sugar Land, TX (US); Karl Friedrich Greb, Sugar Land, TX (US); Rajeev Suvarna, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 149 days.

(21) Appl. No.: 13/896,941

(22) Filed: May 17, 2013

(65) Prior Publication Data

US 2014/0223127 A1    Aug. 7, 2014

Related U.S. Application Data

(60) Provisional application No. 61/762,212, filed on Feb. 7, 2013.

(51) Int. Cl.
*G06F 12/00* (2006.01)
*G06F 12/14* (2006.01)
*G06F 13/16* (2006.01)

(52) U.S. Cl.
CPC ........ *G06F 12/1416* (2013.01); *G06F 12/1458* (2013.01); *G06F 13/1605* (2013.01)

(58) Field of Classification Search
CPC ............ G06F 12/1416; G06F 13/1605; G06F 12/1458
See application file for complete search history.

(56) References Cited

U.S. PATENT DOCUMENTS

| | | | | |
|---|---|---|---|---|
| 5,669,002 A | * | 9/1997 | Buch | 710/200 |
| 5,917,840 A | * | 6/1999 | Cheney et al. | 714/807 |
| 5,918,248 A | * | 6/1999 | Newell et al. | 711/147 |
| 8,024,539 B2 | * | 9/2011 | Thekkath | 711/163 |
| 2002/0065866 A1 | * | 5/2002 | Sueyoshi | 709/102 |
| 2010/0138208 A1 | * | 6/2010 | Hattori et al. | 703/25 |

\* cited by examiner

*Primary Examiner* — Aracelis Ruiz
(74) *Attorney, Agent, or Firm* — Tuenlap D. Chan; Frank D. Cimino

(57) ABSTRACT

A memory protection unit including hardware logic. The hardware logic receives a transaction from a virtual central processing unit (CPU) directed at a bus slave, the transaction being associated with a virtual CPU identification (ID), wherein the virtual CPU is implemented on a physical CPU. The hardware logic also determines whether to grant or deny access to the bus slave based on the virtual CPU ID. The virtual CPU ID is different than an ID of the physical CPU on which the virtual CPU is implemented.

16 Claims, 3 Drawing Sheets

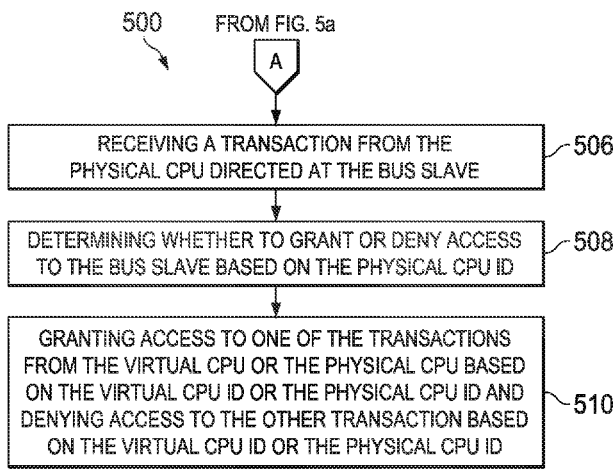
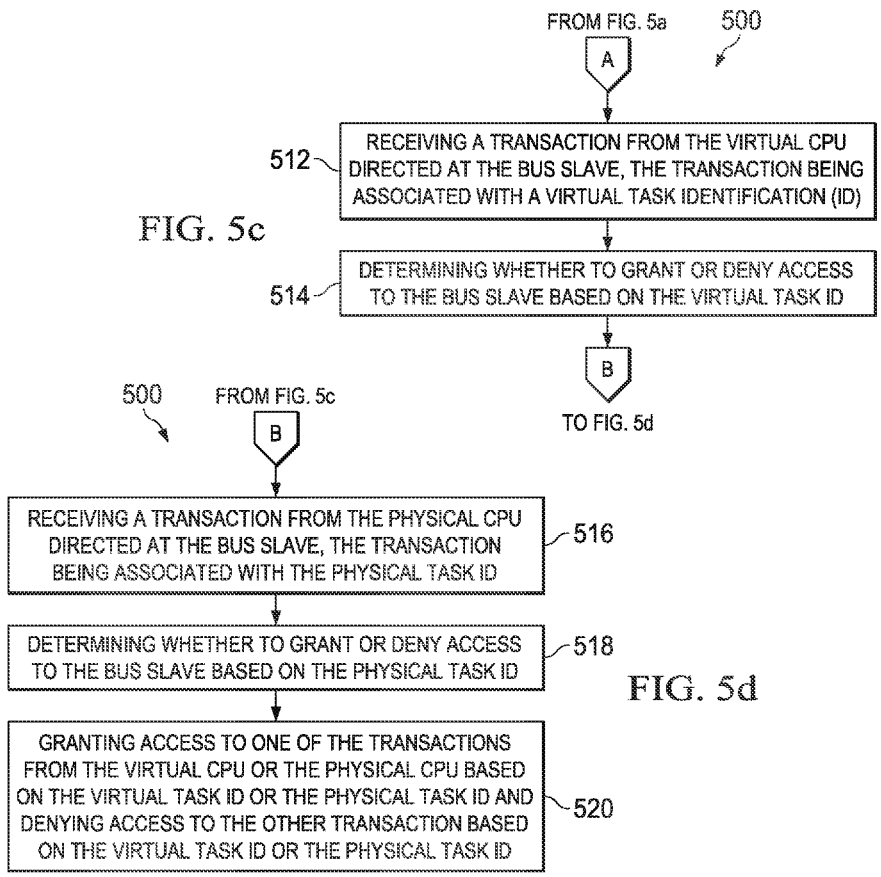

SYSTEM AND METHOD FOR VIRTUAL HARDWARE MEMORY PROTECTION

CROSS-REFERENCE TO RELATED APPLICATION

The present application claims priority to U.S. Provisional Patent Application No. 61/762,212, filed on Feb. 7, 2013; which is hereby incorporated herein by reference.

BACKGROUND

Various processes are governed by international standards relating to safety and risk reduction. For example, IEC 61508 addresses functional safety of electrical, electronic, and programmable electronic devices, such as microcontrollers or other computers used to control industrial or other safety critical processes. IEC 61508 defines Safety Integrity Levels (SIL) based on a probabilistic analysis of a particular application. To achieve a given SIL, the application, including constituent components, must meet targets for the maximum probability of "dangerous failure" and a minimum "safe failure fraction." The concept of "dangerous failure" is defined on an application-specific basis, but is based on requirement constraints that are verified for their integrity during the development of the safety critical application. The "safe failure fraction" determines capability of the system to manage dangerous failures and compares the likelihood of safe and detected failures with the likelihood of dangerous, undetected failures. Ultimately, an electronic device's certification to a particular SIL requires that the electronic device provide a certain level of detection of and resilience to failures as well as enable the safety critical application to transition to a safe state after a failure.

Another functional safety standard is ISO 26262, which addresses the functional safety of road vehicles such as automobiles. ISO 26262 aims to address possible hazards caused by malfunctioning behavior of automotive electronic and electrical systems. Similar to SILs defined by IEC 61508, ISO 26262 provides an automotive-specific risk-based approach to determine risk classes referred to as Automotive Safety Integrity Levels (ASIL). ASILs are used to specify a particular product's ability to achieve acceptable safety goals.

An electronic device that controls a process—industrial, automotive, or otherwise—may be used to perform multiple functions, some of which are "safety functions" while others are "non-safety functions." A safety function is a function whose operation impacts the safety of the process; for example, a closed-loop control system that drives an electric motor used for power steering is a safety function. A non-safety function is a function whose operation does not impact the safety of the process; for example, debug functionality built into the electronic device that is used to develop software for the control functions, but is not used when the electronic device is integrated into a vehicle, is a non-safety function.

SUMMARY

The problems noted above are solved in large part by a memory protection unit including hardware logic. The hardware logic receives a transaction from a virtual central processing unit (CPU) directed at a bus slave, the transaction being associated with a virtual CPU identification (ID), wherein the virtual CPU is implemented on a physical CPU. The hardware logic also determines whether to grant or deny access to the bus slave based on the virtual CPU ID. The virtual CPU ID is different than an ID of the physical CPU on which the virtual CPU is implemented.

Other embodiments of the present disclosure are directed to a memory protection unit including hardware logic. The hardware logic receives a transaction from a virtual central processing unit (CPU) directed at a bus slave, the transaction being associated with a virtual task identification (ID), wherein the virtual CPU is implemented on a physical CPU. The hardware logic also determines whether to grant or deny access to the bus slave based on the virtual task ID. The virtual task ID is different than an ID of a task executed on the physical CPU on which the virtual CPU is implemented.

Still other embodiments of the present disclosure are directed to a method including receiving a transaction from a virtual central processing unit (CPU) directed at a bus slave, the transaction being associated with a virtual CPU identification (ID), wherein the virtual CPU is implemented on a physical CPU. The method also includes determining whether to grant or deny access to the bus slave based on the virtual CPU ID. The virtual CPU ID is different than an ID of the physical CPU on which the virtual CPU is implemented.

BRIEF DESCRIPTION OF THE DRAWINGS

For a detailed description of exemplary embodiments of the invention, reference will now be made to the accompanying drawings in which:

FIGS. 5a-5d show flow charts of a method in accordance with various embodiments.

NOTATION AND NOMENCLATURE

Figure 1:
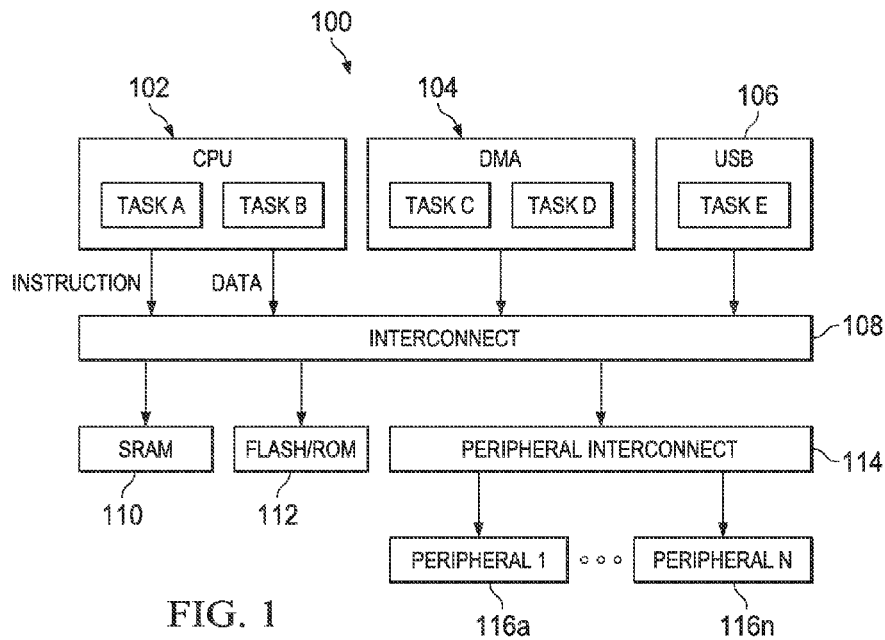
FIG. 1 shows a block diagram of an exemplary system on a chip (SOC) architecture in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "transaction" refers to a request to read from/write to memory or read from/write to another piece of logic or register.

As used herein, the term "bus master" refers to a piece of logic that initiates a transaction.

As used herein, the term "bus slave" refers to a component that receives a transaction; for example, a memory region or a peripheral may be a bus slave.

As used herein, the term "interconnect" refers to a component that distributes a transaction, for example between bus masters and bus slaves.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Safety and non-safety function may be implemented, for example, on a system on a chip (SOC) with one or more processor cores and a memory, which may be shared among processor cores. In theory, a highest level of safety is achieved when a separate SOC carries out each of the various functions of the electronic device. In this way, the operation of a particular function cannot be impaired or corrupted by other functions since a bus master that implements a particular function cannot access any bus slave(s) other than its own. However, such an approach is cost-prohibitive.

To reduce the cost of such electronic devices, safety functions may be implemented alongside non-safety functions, for example with multiple functions carried out by a single SOC. However, to maintain an appropriate SIL, certain functions should be prevented from interfering with other functions (e.g., a function should be prevented from accessing an address region memory that is not allocated to that function or by sending a transaction to a peripheral that is not allocated to that function).

Safety functions may be associated with one of a plurality of SILs. For example, a safety function with a SIL of 3 may require a high level of safety assurance while a function with a SIL of 2 or lower requires a lower level of safety assurance, while still requiring more safety assurance than a non-safety function. That is, the function with a SIL of 3 presents a greater degree of risk relative to the function with a SIL of 2 (or lower) and as such requires greater risk reduction measures. As a result, multiple safety functions may have SILs that are independent of each other. Various standards require required that functions having different SIL ratings should not interfere with one another. Similarly a non-safety critical task must not interfere with a safety critical task. Thus, while a non-safety function should be separated such that the non-safety function does not corrupt the safety function(s), a higher-SIL safety function (i.e., numerically greater) should also be separated such that the lower-SIL safety function does not corrupt the higher-SIL safety function.

FIG. 1 shows a SOC architecture 100 having multiple functions (also referred to as tasks) implemented by a number of bus masters. As explained above, the SOC architecture 100 may be part of an electronic device that controls a process and performs multiple functions. Certain of the tasks may be safety functions, in some cases having varying SILs, and other of the tasks may be non-safety functions. The SOC architecture 100 comprises a CPU 102 implementing tasks A and B, a direct memory access (DMA) engine 104 implementing tasks C and D, and a Universal Serial Bus (USB) controller 106 implementing task E. The CPU 102, DMA engine 104, and USB controller 106 are examples of bus masters.

The SOC architecture 100 also comprises an interconnect 108 that couples the bus masters 102, 104, 106 to exemplary bus slaves, such as random access memory (RAM) 110 and read-only memory (ROM) 112. Additionally, the interconnect 108 may couple the bus masters 102, 104, 106 to peripherals 116a-116n (e.g., a serial port, a general purpose input/output port, or a timer). In some cases, a peripheral interconnect 114 is inserted between the interconnect 108 and the peripherals 116a-116n to further facilitate routing of transactions to the appropriate peripheral 116a-116n.

The SOC architecture 100 is exemplary, and it should be appreciated that multiple instances of various bus masters 102, 104, 106 may exist within an application-specific SOC. Regardless of the particular implementation, maintaining freedom from interference between various tasks at the bus slave level is important to assure that the device that carries out the various tasks achieves an acceptable level of risk. Additionally, as shown in FIG. 1, certain bus masters 102, 104, 106 implement multiple tasks, some of which may be safety functions and others of which may be non-safety functions, and so maintaining freedom of interference between tasks operating on a single bus master 102, 104, 106 is important as well.

Figure 2:
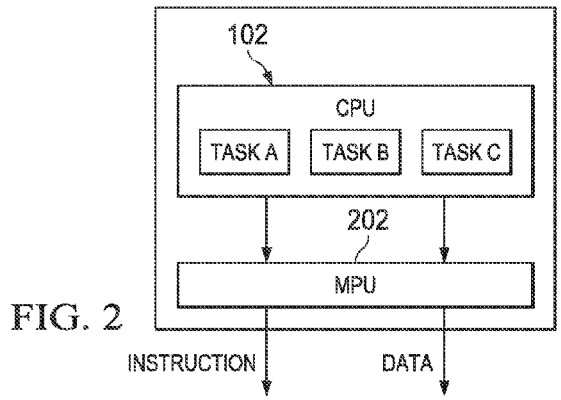
FIG. 2 shows a block diagram of an exemplary memory protection unit (MPU) in conjunction with a multiple-task bus master in accordance with various embodiments.

Turning to FIG. 2, the CPU 102 is shown with a local memory protection unit (MPU) 202. The MPU 202 comprises hardware logic (not shown) that determines whether to grant or deny access to a bus slave on a per transaction basis. The hardware logic may comprise various comparators, encoders, decoders and the like that utilize information contained in a transaction to determine whether to grant or deny access to a bus slave. For example, a transaction may be an instruction fetch or data access request. The MPU 202 may transmit an instruction fetch to an instruction bus, transmit a data access request to a data bus, or transmit either to a mixed instruction and data bus, along with a control signal to identify whether the transaction is an instruction fetch or a data access request. This is shown in FIG. 2 by way of the MPU 202 transmitting the instruction fetch and data access requests separately. The interconnect 108 is meant to represent the various bus implementations.

Information contained in the instruction fetch and/or data access request filed may be used to determine whether to grant or deny access to a bus slave. Additionally, the determination by the MPU 202 of whether to grant or deny access to a bus slave may be based on one or a combination of a number of factors.

In some cases, transactions may be isolated based on the address of memory to which the transaction is directed. For example, certain addresses may be protected while other addresses are non-protected. A transaction originating from a safety function may be granted access by the MPU 202 to an address that is either protected or non-protected, while a transaction originating from a non-safety function is granted access to an address that is non-protected and denied access to an address that is protected. Additionally, in certain embodiments there may be multiple levels of address protection and a higher-level safety function is permitted access to any address, while a lower-level safety function is only permitted access to certain levels of protected addresses and a non-safety function is only permitted access to non-protected addresses.

In other cases, transactions may be isolated based on a privilege level associated with the function or task that generates the transaction. For example, certain functions may be "privileged" and other functions may be "non-privileged." Transactions originating from a privileged function may be granted access by the MPU 202 to bus slaves that require a privileged level and transactions originating from a non-privileged function may be denied access to bus slaves that require a privileged level. Similarly, transactions may be isolated based on a security level where some functions comprise trusted code while other functions comprise non-trusted code. Transactions originating from trusted code are granted access by the MPU 202 to secure bus slaves and transactions originating from non-trusted code are denied access to secure bus slaves.

Additionally, transactions may be isolated based on a task identification (ID) associated with the function or task that generates the transaction. For example, the bus master or a CPU 102 may assign a task ID to each task that is running, which can be used by the MPU 202 to discriminate permissions on a per task basis. Alternately, transactions may be isolated based on whether the transaction originated from a function or task executed by a bus master that is a "functional unit" or executed by a bus master that is a "debug unit." The MPU 202 may grant access to certain bus slaves for tasks originating from a functional unit and deny access to those bus slaves for tasks originating from a debug unit.

Referring to FIGS. 1 and 2, address regions of the RAM 110 and/or ROM 112 have associated permissions. If various attributes of a particular function or task satisfy the permission level of the address region, the MPU 202 grants access to a transaction originating from that function or task. If the attributes do not satisfy the permission level of the address region, access is denied. For certain components that support the execution of more than one task (e.g., CPU 102), the associated MPU 202 is reconfigured when the task being executed changes to support task-based isolation. Configuration of the MPU 202 refers to the access permissions that are applied to the currently-executing task. For example, a memory buffer may belong to a first task. When the CPU 102 is executing the first task, the MPU 202 is configured to permit access to the memory buffer; however, when the CPU 102 switches to a second task, the MPU 202 is reconfigured to prevent access to the memory buffer. The MPU 202 may have many stored configurations corresponding to different tasks executed by the CPU 102. In some embodiments, the MPU 202 may switch configurations based on a different received task ID for a transaction. In other embodiments, such as where the bus master is the CPU 102, software executing on the CPU 102 that changes the task also reconfigures the MPU 202.

In the event of an attempted violation of access rules implemented by the MPU 202, various actions may be taken. For example, the MPU 202 may report the attempted access violation to a system-level monitoring task executing on the CPU 102. In some cases, the MPU 202 blocks the transaction from occurring, while in other cases the MPU 202 tags the transaction as having an error. Further, in security-sensitive applications where a transaction tagged as having an error may provide useful information to a malicious entity attempting to gain access to secure memory, a response may be generated that mimics a normal response, but which contains false data.

Figure 3:
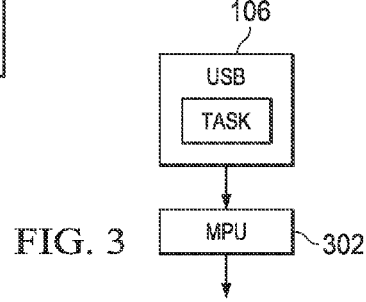
FIG. 3 shows a block diagram of an exemplary MPU in conjunction with a single-task bus master in accordance with various embodiments.

FIG. 3 shows the USB controller 106, which is an example of a single-task bus master. In the case of a single-task bus master, a MPU 302 similar to the MPU 202 is implemented, although on a simplified basis. For example, the USB controller 106 typically accesses only two regions—a transmit buffer and a receive buffer. Additionally, it is not necessary that the MPU 302 implement task-based discrimination since only one task is implemented by the USB controller 106.

In the above examples, a MPU 202, 302 facilitates protection of certain regions of memory and/or certain peripherals by limiting access by lower-level or non-safety functions where appropriate. As a result, an acceptable level of safety is achieved by the overall device on which the SOC architecture 100 is implemented while reducing the cost of the device by implementing many functions on a single SOC.

Figure 4:
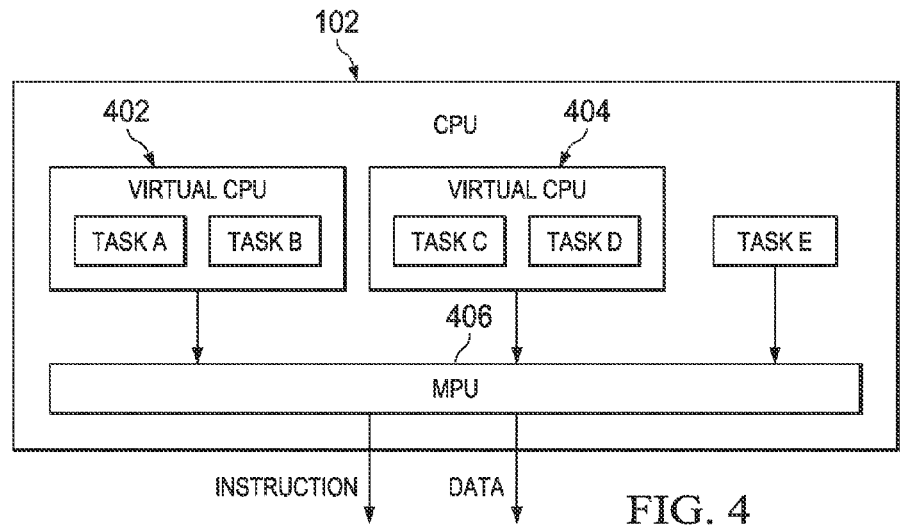
FIG. 4 shows a block diagram of an exemplary MPU in conjunction with a multiple-task bus master with a virtualized hardware scheme in accordance with various embodiments.

In accordance with various embodiments, a bus master, such as the CPU 102, may implement multiple instances of virtualized hardware to perform various functions. Turning to FIG. 4, the CPU 102 may contain a first virtual CPU 402 that implements a safety function and a second virtual CPU 404 that implements a non-safety function. However, since both the safety function and the non-safety function are implemented by the same physical CPU (i.e., the CPU 102), the CPU ID for a transaction generated by either function would be the same. Additionally, in some cases a task ID for a transaction generated by either function may be the same. Thus, the MPU 202 described above would not be able to differentiate the transactions and a lower-level or non-safety function may be inappropriately granted access to a particular bus slave.

In accordance with various embodiments, a virtual CPU ID is associated with each virtual CPU 402, 404 simulated on the physical CPU 102. Additionally, a virtual task ID may be associated with each virtual task running on the virtual CPUs 402, 404. An MPU 406 associated with a bus master that implements virtualized hardware (e.g., the physical CPU 102 implementing one or more virtual CPUs 402, 404) grants or denies access to a peripheral, memory region, or other bus slave based on the virtual CPU ID and/or the virtual task ID. As such, memory protection is enabled, achieving an acceptable level of risk, even in systems where safety and non-safety functions are implemented in virtualized hardware.

Further, the physical CPU 102 may execute tasks (e.g., task E) independently of tasks (e.g., tasks A-D) executed by the virtual CPUs 402, 404. In such cases, the MPU 406 does not only grant or deny access based on virtual CPU ID or virtual task ID, but rather grants and denies access generally based on virtual CPU ID and CPU ID or virtual task ID and task ID. In this way, the MPU 406 applies an equal permission scheme to CPUs, regardless of whether they are virtual CPUs 402, 404 or a physical CPU 102. Similarly, the MPU 406 applies an equal permission scheme to tasks, regardless of whether they are tasks implemented by virtual hardware (i.e., tasks A-D implemented by virtual CPUs 402, 404) or tasks implemented by physical hardware (i.e., task E implemented by CPU 102).

Figure 5A:
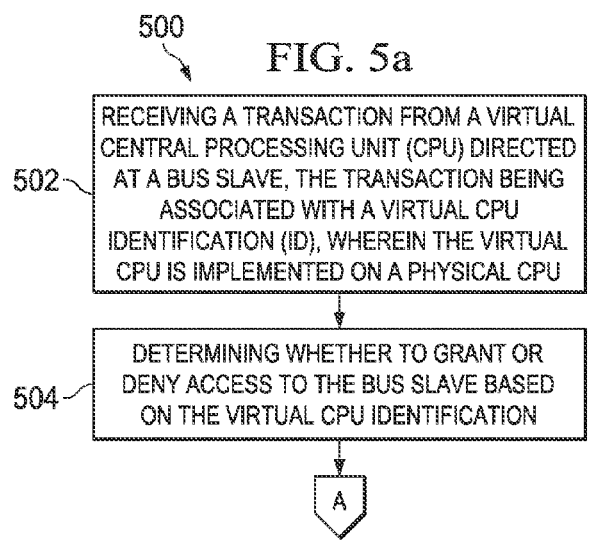

FIGS. 5a-5d show a method 500 in accordance with various embodiments. FIG. 5a shows the method 500 beginning in block 502 with receiving a transaction from a virtual CPU directed at a bus slave. The virtual CPU is implemented on a physical CPU and the transaction is associated with a virtual CPU ID. The method 500 continues in block 504 with determining whether to grant or deny access to the bus slave based on the virtual CPU ID. As explained above, memory protection is thus enabled even where various functions are implemented in virtualized hardware. For example, a safety function may execute on the virtual CPU while a non-safety function executes on the physical CPU. Conventionally, each function would only be associated with the physical CPU ID, and thus could not be differentiated because they execute on the same physical bus master. However, in accordance with various embodiments, an MPU such as MPU 406 enables the differentiation of these functions, since both virtual and physical CPU IDs are considered.

Turning to FIG. 5b, the method 500 may optionally include receiving a transaction from the physical CPU also directed at the bus slave as in block 506. The method 500 continues in block 508 with determining whether to grant or deny access to the bus slave based on the physical CPU ID. Then, in block 510, the method includes granting access to one of the transactions from the virtual and physical CPUs based on the virtual and physical CPU IDs, respectively, and denying access to the other transaction. This further illustrates the functionality explained above, where the MPU 406 differentiates between transactions originating on a physical CPU and a virtual CPU implemented on the physical CPU.

FIG. 5c further shows the method 500 optionally including receiving a transaction from the virtual CPU directed at the bus slave as in block 512. The transaction is associated with a virtual task ID. The method 500 continues in block 514 with determining whether to grant or deny access to the bus slave based on the virtual task ID. The method 500 shown in FIG. 5c may optionally continue as shown in block 516 of FIG. 5d with receiving a transaction from the physical CPU directed at the bus slave. The transaction is associated with a physical task ID. The method 500 continues in block 518 with determining whether to grant or deny access to the bus slave based on the physical task ID. In block 520, the method 500 includes granting access to one of the transactions from the virtual or physical CPUs based on the virtual and physical task IDs and denying access to the other transaction. In this way, regardless of whether a transaction originates from a virtual or physical CPU, its associated task ID (i.e., virtual task ID or physical task ID) may be used to differentiate a level of memory protection allowed for each transaction.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A memory protection unit, comprising:
hardware logic to:
receive a transaction from a virtual central processing unit (CPU) directed at a bus slave, the transaction being associated with a virtual CPU identification (ID) indicating a safety level of the transaction, wherein the virtual CPU is implemented on a physical CPU; and
determine whether to grant or deny access to the bus slave based on the safety level indicated by the virtual CPU ID;
wherein the virtual CPU ID is different than an ID of the physical CPU on which the virtual CPU is implemented.

2. The memory protection unit of claim 1 wherein the hardware logic is configured to:
receives a second transaction from the physical CPU directed at the bus slave, the second transaction being associated with the physical CPU ID; and
determines whether to grant or deny access to the bus slave based on the physical CPU ID;
wherein the hardware logic grants or deny access to the transaction from the virtual CPU and the second transaction from the physical CPU based on the virtual CPU ID and the physical CPU ID respectively.

3. The memory protection unit of claim 1 wherein the hardware logic is configured to:
receive a second transaction from the virtual CPU directed at the bus slave;
determine on a per transaction basis whether to grant or deny access to the bus slave;
deny the second transaction to access to the bus slave based on a factor unique to the second transaction even when the safety level is granted.

4. The memory protection unit of claim 3 wherein the factor unique to the second transaction is selected from a group consisting of:
an address to which the second transaction is directed;
a privilege level associated with a task that generated the second transaction;
a task security level associated with the task that generated the second transaction; and
a determination on whether the second transaction is generated by a functional unit of the virtual CPU or a debug unit of the virtual CPU.

5. A memory protection unit, comprising:
hardware logic to:
receive a transaction from a virtual central processing unit (CPU) directed at a bus slave, the transaction being associated with a virtual task identification (ID) indicating a safety level of the transaction, wherein the virtual CPU is implemented on a physical CPU;
determine whether to grant or deny access to the bus slave based on the safety level indicated by the virtual task ID;
wherein the virtual task ID is different than an ID of a task executed on the physical CPU on which the virtual CPU is implemented.

6. The memory protection unit of claim 5 wherein the hardware logic is configured to:
receives a second transaction from the physical CPU directed at the bus slave, the second transaction being associated with the physical task ID; and
determines whether to grant or deny access to the bus slave based on the physical task ID;
wherein the hardware logic grants or deny access to the transaction from the virtual CPU and the second transaction from the physical CPU based on the virtual CPU ID and the physical ID respectively.

7. The memory protection unit of claim 5 wherein the hardware logic is configured to:
receive a second transaction from the virtual CPU directed at the bus slave;
determine on a per transaction basis whether to grant or deny access to the bus slave;
deny the second transaction to access to the bus slave based on a factor unique to the second transaction even when the safety level is granted.

8. The memory protection unit of claim 7 wherein the factor unique to the second transaction is selected from a group consisting of:
an address to which the second transaction is directed;
privilege level associated with a task that generated the second transaction;
a task security level associated with the task that generated the second transaction; and
a determination on whether the second transaction is generated by a functional unit of the virtual CPU or a debug unit of the virtual CPU.

9. A method comprising:
receiving a transaction from a virtual central processing unit (CPU) directed at a bus slave, the transaction being associated with a virtual CPU identification (ID) indicating a safety level of the transaction, wherein the virtual CPU is implemented on a physical CPU; and
determining whether to grant or deny access to the bus slave based on the safety level indicated by the virtual CPU ID;
wherein the virtual CPU ID is different than an ID of the physical CPU on which the virtual CPU is implemented.

10. The method of claim 9 further comprising:
receiving a second transaction from the physical CPU directed at the bus slave, the second transaction being associated with the physical CPU ID;
determining whether to grant or deny access to the bus slave based on the physical CPU ID;
granting access to one of the transaction from the virtual CPU or the second transaction from the physical CPU based on the virtual CPU ID and the physical CPU ID respectively; and
denying access to one of the transaction from the virtual CPU or second transaction from the physical CPU based on the virtual CPU ID or physical CPU ID.

11. The method of claim 9 further comprising:
receiving a second transaction from the virtual CPU directed at the bus slave;
determining on a per transaction basis whether to grant or deny access to the bus slave;
denying access to the bus slave based on a factor unique to the second transaction even when the safety level is granted.

12. The method of claim 11 wherein the factor unique to the second transaction is selected from a group consisting of:
an address to which the second transaction is directed;
a privilege level associated with a task that generated the second transaction;
a security level associated with the task that generated the second transaction; and
a determination on whether the second transaction is generated by a functional unit of the virtual CPU or a debug unit of the virtual CPU.

13. The method of claim 9 further comprising:
receiving a second transaction from the virtual CPU directed at a bus slave, the second transaction being associated with a virtual task identification (ID); and
determining whether to grant or deny the second transaction to access to the bus slave based on the virtual task ID;
wherein the virtual task ID is different than an ID of a task executed on the physical CPU on which the virtual CPU is implemented.

14. The method of claim 13 further comprising:
receiving a third transaction from the physical CPU directed at the bus slave, the third transaction being associated with the physical task ID; and
determining whether to grant or deny the third transaction to access to the bus slave based on the physical task ID;
granting access to one of the second transaction from the virtual CPU or the third transaction from the physical CPU based on the virtual task ID and the physical task ID, respectively; and
denying access to one of the second transaction from the virtual CPU or third transaction from the physical CPU based on the virtual task ID or physical task ID.

15. The method of claim 13 further comprising:
receiving a third transaction from the virtual CPU directed at the bus slave;
determining on a per transaction basis whether to grant or deny access to the bus slave;
denying access to the bus slave based on a factor unique to the third transaction even when the safety level is granted.

16. The method of claim 15 wherein the factor unique to the third transaction is selected from a group consisting of:
an address to which the third transaction is directed;
a privilege level associated with a task that generated the third transaction;
a security level associated with the task that generated the third transaction; and
a determination on whether the third transaction is generated by a functional unit of the virtual CPU or a debug unit of the virtual CPU.

\* \* \* \* \*